United States Patent
Freund et al.

(10) Patent No.: US 6,829,575 B2
(45) Date of Patent: Dec. 7, 2004

(54) ENTERPRISE JAVABEANS CONTAINER

(75) Inventors: Thomas James Freund, Winchester (GB); R. Anthony Storey, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 10/385,561

(22) Filed: Mar. 11, 2003

(65) Prior Publication Data
US 2004/0068537 A1 Apr. 8, 2004

(30) Foreign Application Priority Data
Oct. 2, 2002 (GB) .............................................. 0222916

(51) Int. Cl.[7] .............................................. G06F 17/30
(52) U.S. Cl. ..................................... 704/107.1; 707/10
(58) Field of Search ............................ 707/101, 104.1; 709/202; 714/38; 717/102; 719/315, 316

(56) References Cited

U.S. PATENT DOCUMENTS 6,675,227 B1 * 1/2004 Gavrilo et al. .............. 719/316
6,704,805 B1 * 3/2004 Acker et al. ................ 719/315

OTHER PUBLICATIONS

Paul Anderson et al., The Benefits of Stateful Session Beans, Mar. 29, 2002, Prentice Hall, pp. 1–34.*
JGuru, Smart Operation Management for Distributed Apps, Jan. 2, 2002, pp. 1–3.*

* cited by examiner

Primary Examiner—Diane D. Mizrahi
Assistant Examiner—Apu Mofiz
(74) Attorney, Agent, or Firm—Gregory M. Doudnikoff

(57) ABSTRACT

The present invention provides a more flexible version of an EJB container which permits easy definition an EJB component which observes a behavior pattern which is not typical of a session, entity or message driven bean types. In this flexible EJB container, behavior characteristics normally fixed by the bean type of the EJB component, such as passivation policy, usage, recoverability, and relocatability can be separately defined for each EJB component.

3 Claims, 3 Drawing Sheets

|  | Stateless Session | Stateful Session | Entity | Message Driven |
|---|---|---|---|---|
| activation | creation | creation | creation | message driven |
| usage | single user | single user | multiple user | multi-message |
| state | stateless | stateful | stateful | stateless |
| recoverability | transient | transient | persistent | transient |
| synchronised | no | optional | no | no |
| passivation policy | never | outside trans | anytime | never |
| relocatable | no | yes | no | no |

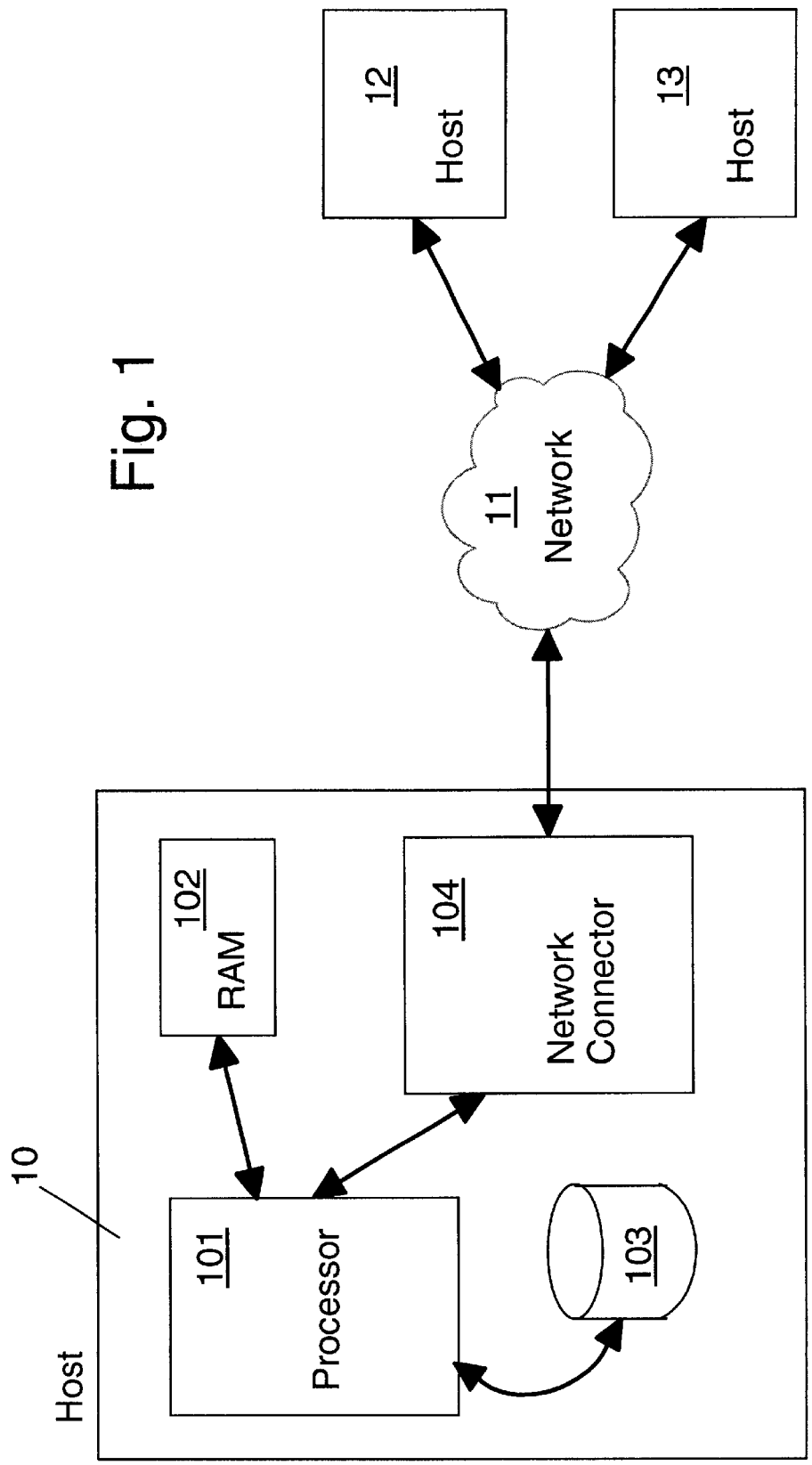

Fig. 2

| | Stateless Session | Stateful Session | Entity | Message Driven |
|---|---|---|---|---|
| activation | creation | creation | creation | message driven |
| usage | single user | single user | multiple user | multi-message |
| state | stateless | stateful | stateful | stateless |
| recoverability | transient | transient | persistent | transient |
| synchronised | no | optional | no | no |
| passivation policy | never | outside trans | anytime | never |
| relocatable | no | yes | no | no |

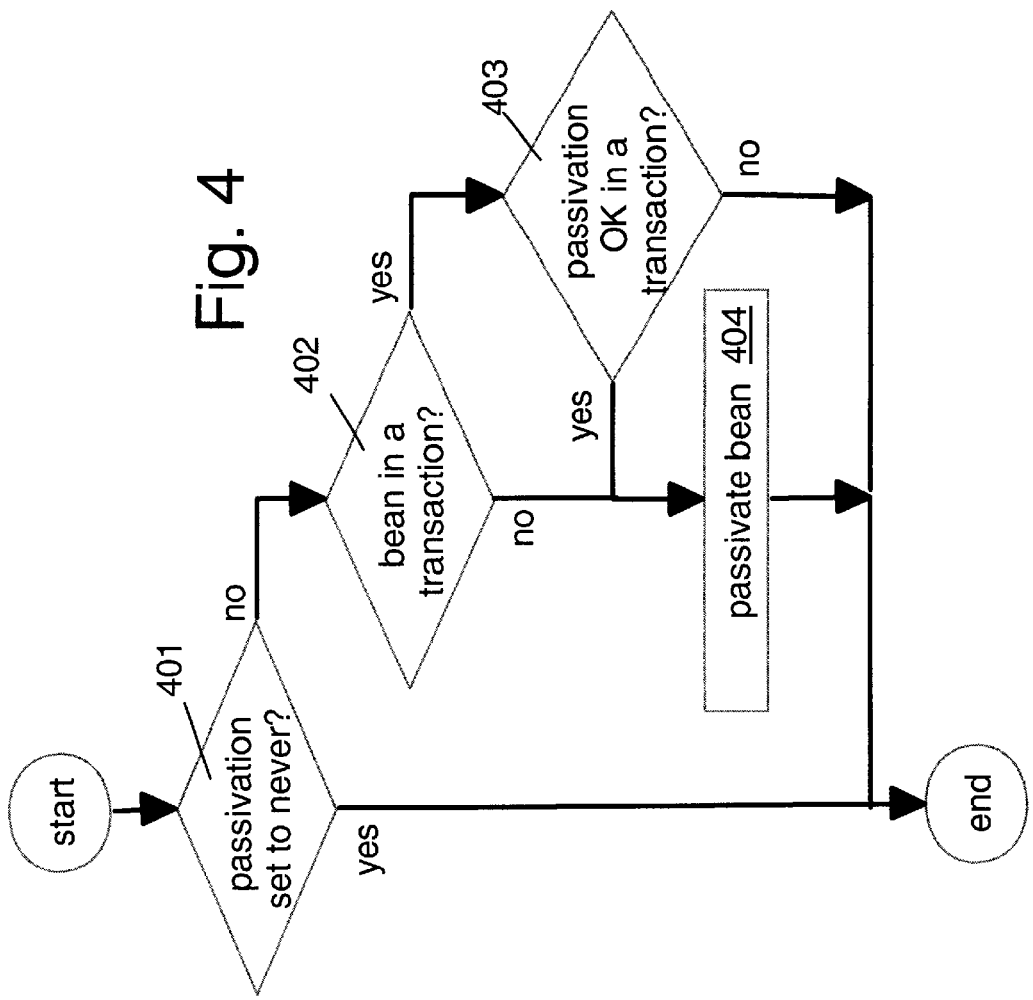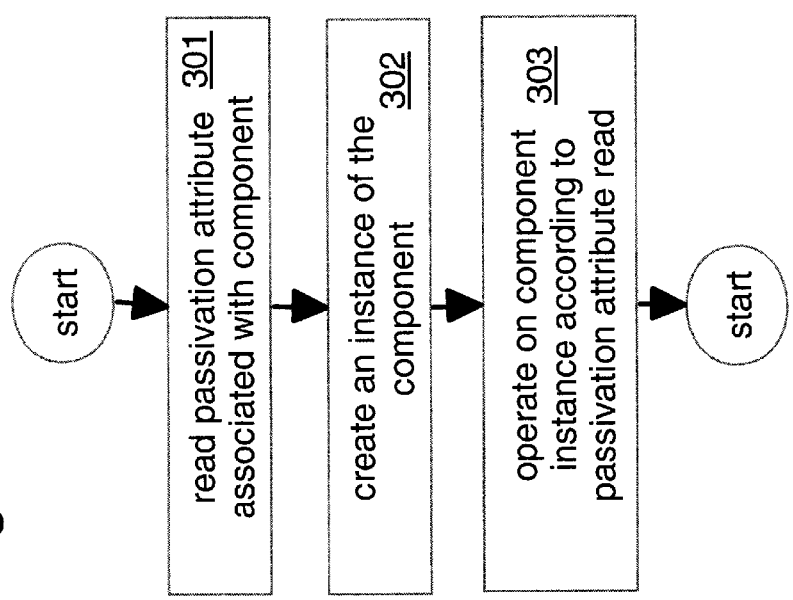

ENTERPRISE JAVABEANS CONTAINER

FIELD OF THE INVENTION

The present invention relates to Enterprise JavaBeans (EJB) and more particularly to the provision of a new type of EJB container. (Enterprise JavaBean and EJB are registered trade marks of Sun Micrsosytems Inc.)

BACKGROUND OF THE INVENTION

Client/Server computing first became fashionable in the 1960's as a good method of providing many users of small machines (clients) access to data maintained by large systems (servers), the data being maintained in a database. A typical client/server architecture is one in which the client accesses the server through middleware. In this architecture the client is fairly simple and uses applications that run in a server and the middleware handles the complexities of, for example, client/server communication and transaction management. This enables the application writer to concentrate on client and application functionality whilst the middleware takes care of the rest. However, one problem that developed in this architecture was that many middleware products came to the market each providing different functions and different interfaces to those functions. As a result client and application code had to be written to interface with a particular middleware product and could not easily be ported between different middleware products. Further the clients written for one middleware product could not access applications written for a different middleware product.

In order to solve this problem the middleware industry started to look into specifying a standard middleware architecture and interface. There have been several attempts at this and one such attempt was the Common Object Request Broker Architecture (CORBA) which was first published in 1991. However whilst CORBA has been successful and implemented by several middleware products it has been largely superseded by Enterprise JavaBeans which has been built on the success of JavaBeans, Enterprise JavaBeans basically providing applications as JavaBeans in a distributed client/server environment.

The first EJB specification (1.0) was published in March 1998 and was the culmination of several years work between Sun Microsystems Inc. and partner companies, such as IBM, Oracle and Hewlett Packard. From this date there have been many implementations of EJB server products and much has been written about the subject. Indeed most aspects of EJB could now be considered well known and well researched by the those skilled in art. Also the specification of EJB has been improved and extended and recently an new specification, EJB 2.1, was issued as a final draft in June 2002.

A fundamental concept of the EJB Architecture is the EJB Container. An EJB container runs in a server (EJB Server) and a JavaBean (EJB Component) runs in the EJB Container. The EJB specification specifies an interface and services that an EJB Container must provide to both the EJB component and a client (EJB Client) of that EJB component. In this architecture the middleware providers provide an EJB container implementation, conforming to the specified interface and services, for the software platform(s) of their choice. This enables an EJB Client and an EJB Component to be written which can run in, and communicate with, an EJB container implemented by any middleware provider.

The EJB specification specifies containers for 3 different types of EJB Components (beans) and, for each type, a contract (set of interfaces) between the EJB Component and EJB container. The 3 types of EJB Components are known as session beans, entity beans and message driven beans. Session and Entity beans were defined in the first EJB specification and message driven beans are a more recent addition. At a basic level session beans: execute on behalf of a single client; are short lived; do not survive an EJB server crash; can survive several client request; can have a state; and can access shared data in a database. Entity beans: can execute on behalf of many clients; are long lived; are recovered in the event of an EJB server crash; have a key by which they can be found; and tend to represent data in a database. A message driven bean: is not accessed by a client; acts as a message listener by receiving messages, from multiple clients, for processing; does not retain data; and may, for example, pass the message to an entity or session bean for processing. Note that because each EJB Component type has a different contract with its container, an implemented session bean, for example, cannot be run as an entity bean because it will not provide all of the interfaces which the container expects to be able to call on an entity bean. It can thus be seen that, according to its type, an implementation of an EJB Component must provide specified interfaces and observe specified behaviour characteristics, in order to fulfill its contract with the container.

Associated with each EJB Component, regardless of its type, is a deployment descriptor. The deployment descriptor contains details of the EJB Component, such as its bean name, class, remote interfaces, type (session, entity or message driven), and other execution requirements such as its transactional and security requirements. It is thus through the deployment descriptor that a container discovers the bean type of an EJB Component. The container is then responsible for assuring that the execution requirements specified in the deployment descriptor are satisfied before a method request or message is passed to the EJB Component for processing.

However, whilst this provides reasonably flexible support for EJB Components and their clients, despite the fact that the EJB specification is the product of a committee of many engineers from many leading companies, the specification is somewhat rigid in that few bean types are supported. As a result if there is a requirement to implement an EJB Component which does not follow the behaviour pattern of one of the defined bean types it either cannot be supported by an EJB Container, or has to be implemented as multiple, interdependent, EJB Components of different types.

SUMMARY OF THE INVENTION

Accordingly the present invention provides a more flexible EJB container which permits easy definition an EJB component that observes a behaviour pattern which is not typical of session, entity or message driven bean types. In this flexible EJB container, behaviour characteristics normally fixed by the bean type of the EJB component, such as passivation policy, usage, recoverability, and relocatability can be separately defined for each EJB component.

According to a first aspect the present invention provides an EJB container which provides an execution environment for an EJB component, the EJB container supporting a set of behaviour patterns for the component including: single user access or multiple user access; transient or persistent data content; passivation never, anytime, or outside of a transaction; and relocatable to another server or not; wherein, a subset of the set of the behaviour patterns is separately selectable for the EJB component based on attributes associated with the component.

According to a second aspect the present invention provides a method for an EJB container to provide an execution environment, in an EJB server, for an EJB component, the method comprising the steps: reading a plurality of attributes associated with the EJB component; and operating on the EJB component in accordance with the attributes; wherein the attributes define a set of behaviour patterns for the component including: single user access or multiple user access; transient or persistent data content; passivation never, anytime, or outside of a transaction; and relocatable to another server or not; and wherein, a subset of the set of the behaviour patterns is separately selectable for the EJB component.

According to a third aspect the present invention provides a computer program product comprising instructions which, when executed on a data processing host, cause the host to carry out a method of the second aspect.

BRIEF DESCRIPTION OF THE DRAWINGS

The invention will now be described, by way of example only, with reference to a preferred embodiment thereof, as illustrated in the accompanying drawings, in which:

FIG. 1 is a schematic diagram of a data processing system in which the invention may be advantageously installed;

FIG. 2 is a prior art table of behaviour characteristics, assumed by an EJB Container, for an EJB component according to its defined bean type;

FIG. 3 is a flow chart of an EJB Container processing an separately defined passivation policy attribute for an EJB Component; and FIG. 4 is a flow chart of the container passivating an EJB component based on the passivation policy attribute for the EJB Component.

DESCRIPTION OF THE PREFERRED EMBODIMENT

FIG. 1 is a block diagram of a data processing environment in which the preferred embodiment of the present invention can be advantageously applied; In FIG. 1, a client/server data processing host 10 is connected to other client/server data processing host 12 and 13 via a network 11, which could be, for example, the Internet. EJB clients and EJB Servers may be installed on any such client/server data processing host. For example hosts 10 and 11 may have a EJB clients installed and host 12 have an EJB Server installed. The EJB Server includes an EJB Container which provides an execution environment for one or more EJB Components. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Note that in the remainder of the specification "container" and "component", where used, should be assumed to refer to an EJB Container and an EJB Component, respectively.

In the EJB specification an EJB Component has an associated deployment descriptor which contains runtime attributes for the EJB Component. One of these attributes specifies the bean type which may be one of four bean types: session—stateless; session—stateful; entity; and message driven. According to the type which is set for a bean an EJB container assumes a fixed set of behaviour characteristics which, during execution, an instance of the EJB component will follow. Further, associated with these behaviour characteristics is a component/container contract which defines a set of methods for which the EJB Component must provide an implementation. A list of key behaviour characteristics, which, according to the prior art are fixed based on the bean type of the EJB Component is shown in FIG. 2, although this list is should not be considered exhaustive. The characteristics shown in FIG. 2 are as follows:

Activation:
    Creation: A component instance is created on request by a client.
    Message driven: A component instance is created on receipt of a message to process the message.

Usage:
    Single User: An instance of the component has no associated identity. A client creates a new instance, uses it, and deletes it.
    Multiple User: An instance of the component has an identity such that once it has been created it can be located by a client that did not create it. For example, one client can create it, a second client can find and use it, and a third client can find and delete it.
    Multiple Message : An new instance is created to process and inbound message. Once the message has been processed the instance can be pooled and re-used for subsequent messages and can be deleted at any time by the container.

State:
    Stateless: A component instance is stateless if it retains no memory of previous calls. For a given method every call to it would not be affected by a previous call.
    Stateful: A component instance is stateful if it retains a memory of a previous call. The state can be kept in memory or in storage, such as in a database.

Recoverability:
    Persistent: A component instance will survive a failure of the EJB server in which it is running. As a result any data held by the component instance is recovered and is therefore persistent. The component instance survives an EJB server failure because the container keeps a log of its existence and the data is kept securely, for example, in a database.
    Transient: A component instance will not survive a failure of the EJB server in which it is running. As a result any data held by the component is lost and is therefore transient.

Synchronised:
    Optional: When involved in a transaction the component instance is called with before_completion( ) prior to completion of the transaction and with after_completion( ) following completion of the transaction. This is optional because the methods are only called if the component provides an implementation of the methods.
    No: When involved in a transaction the component instance is not called with before_completion( ) prior to completion of the transaction and with after_completion( ) following completion of the transaction.

Passivation Policy
    Never: A component instance is never passivated.
    Outside transaction: A component instance can be passivated but not when it is running under the scope of a transaction. In passivation a component is called with an ejbPassivate( ) method and then quiesced (removed from memory).

Anytime: A component instance can be passivated at any time the container chooses, irrespective of whether it is running under the scope of a transaction.

Relocatable:

Yes: A component instance can be passivated in one server and re-activated in a second server.

No: A component instance that is passivated must be reactivated in the same server.

According to the present invention at least one of these behaviour characteristics is not defined for a component according to its bean type but is separately defined by an attribute associated with the bean.

For example, the passivation policy for a bean is not assumed by the EJB container based on the bean type but instead by a passivation attribute associated with the component. This enables, for example, an entity bean which contains dynamic data which would be lost as a result of passivation to specify a passivation policy of never.

FIG. 3 is an example of the processing of the container when first loading a bean if a passivation policy attribute, for example, is separately defined from the bean type. At step 301 the passivation policy attribute for the component is read from the deployment descriptor associated with the component. Some time later, at the request of a client, the container creates an instance of the component. It then, at step 303 operates on the bean instance according to the passivation policy attribute read.

FIG. 4 is an example of how the container may operate on the component instance based on the attribute read at step 301 of FIG. 3. It is assumed in FIG. 4 that for some reason, such as EJB server resources becoming constrained, the container wishes to passivate one or more component instances. At step 401 the container checks to see if the passivation policy attribute for the component, read at step 301 of FIG. 3, is set to never. If this is the case the container does not passivate the component instance. If the passivation policy attribute was not never, the container, at step 402, checks to see if the component is currently participating in a transaction. If the component is participating in a transaction a check is made, at step 403, to see if the passivation policy attribute is set to allow passivation during a transaction. If the bean in not participating in a transaction, or is participating in a transaction but the attribute allows passivation in this state, at step 404 the bean is passivated, otherwise it is not.

Accordingly it has been demonstrated how a passivation policy attribute is provided which is separately definable from the bean type. It has been further demonstrated how this attribute is handled by the Container. Similarly other attributes may be handled in this way and it would be obvious to a person skilled in the art how these may be acted upon by the container.

Note that preferably a bean type can also be set for a component as some of the attributes can be fixed accordingly whilst other may be defined separately.

Thus the present invention provides a more flexible version of an EJB container which permits easy definition an EJB component which observes a behaviour pattern which is not typical of a session, entity or message driven bean type. In this flexible EJB container, behaviour characteristics normally fixed by the bean type of the EJB component, such as passivation policy, usage, recoverability, and relocatability can be separately defined for each EJB component.

What is claimed is:

1. An EJB container which provides an execution environment for an EJB component, the EJB container supporting a set of behaviour patterns for the component including:

single user access or multiple user access;

transient or persistent data content;

passivation never, anytime, or outside of a transaction; and relocatable to another server or not;

wherein, a subset of the set of the behaviour patterns is separately selectable for the EJB component based on attributes associated with the component.

2. A method for an EJB container to provide an execution environment, in a server, for an EJB component, the method comprising the steps:

reading a plurality of attributes associated with the EJB component; and operating on the EJB component in accordance with the attributes;

wherein the attributes support a set of behaviour patterns for the component including:

single user access or multiple user access;

transient or persistent data content;

passivation never, anytime, or outside of a transaction; and relocatable to another server or not;

and wherein, a subset of the set of the behaviour patterns is separately selectable for the EJB component.

3. A computer program product comprising instructions which, when executed on a data processing host, cause the host to carry out a method as claimed in claim 2.

* * * * *